(12) United States Patent
Allen et al.

(10) Patent No.: US 6,356,614 B1
(45) Date of Patent: Mar. 12, 2002

(54) ANCHOR ASSEMBLY FOR FUEL BUNDLE

(75) Inventors: Bruce F. Allen, Granby, CT (US); Edward F. Lamoureux, Hampden, MA (US); Brian W. Ring, Roxbury, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/596,334

(22) Filed: Jun. 19, 2000

(51) Int. Cl.[7] .................................................. G21C 3/32
(52) U.S. Cl. ........................................ 376/437; 376/434
(58) Field of Search ................................ 376/262, 264, 376/426, 429, 431, 434, 437, 451; 411/43, 54.1

(56) References Cited

U.S. PATENT DOCUMENTS

| | | | |
|---|---|---|---|
| 3,212,991 A | * 10/1965 | Brynsvold et al. | 376/434 |
| 3,932,217 A | * 1/1976 | Cachera | 376/434 |
| 4,146,953 A | 4/1979 | King, Jr. | 29/453 |
| 4,474,616 A | 10/1984 | Pitzer | 208/391 |
| 4,761,105 A | 8/1988 | Gardner | 411/80.2 |
| 4,878,790 A | 11/1989 | McSherry et al. | 411/34 |
| 5,052,870 A | 10/1991 | Pratt et al. | 411/43 |
| 5,056,973 A | 10/1991 | Pratt et al. | 411/43 |
| 5,608,768 A | * 3/1997 | Matzner et al. | 376/451 |
| 5,730,540 A | 3/1998 | Duran et al. | 403/21 |
| 6,036,418 A | 3/2000 | Stencel et al. | 411/54.1 |

* cited by examiner

Primary Examiner—Charles T. Jordan
Assistant Examiner—Elizabeth Shaw

(57) ABSTRACT

Anchor assembly apparatus for improving the structural integrity of a guide tube (26) in a nuclear fuel bundle (20). A sleeve (100) has a proximate end (102) and a distal end (104) that is adapted for insertion into a receiving end (38) of the guide tube. A pin (140) has a near end (142) and a far end (144) adapted for insertion into the sleeve at the sleeve's proximate end. The pin has an external surface (148) that applies a radial force to an inner surface (118) of the sleeve when the pin is inserted into the sleeve. The force is sufficient to cause a locking surface (120) on the sleeve to expand radially outward.

22 Claims, 4 Drawing Sheets

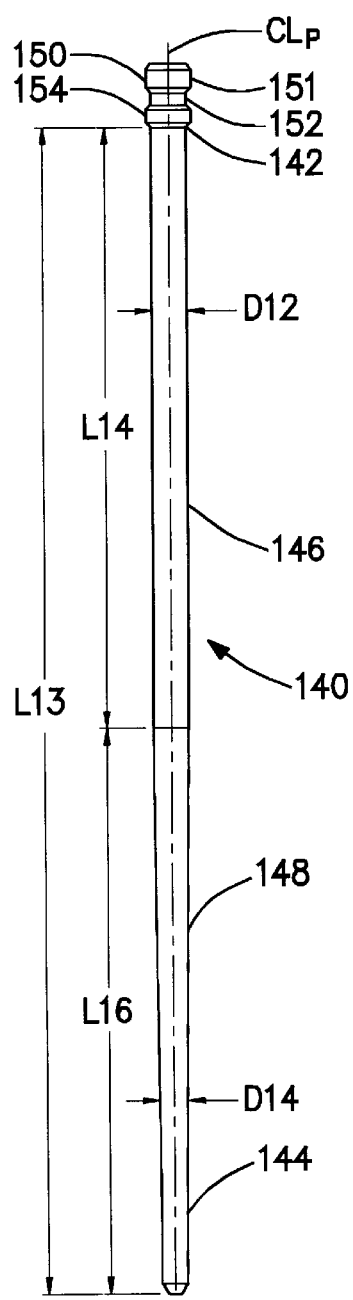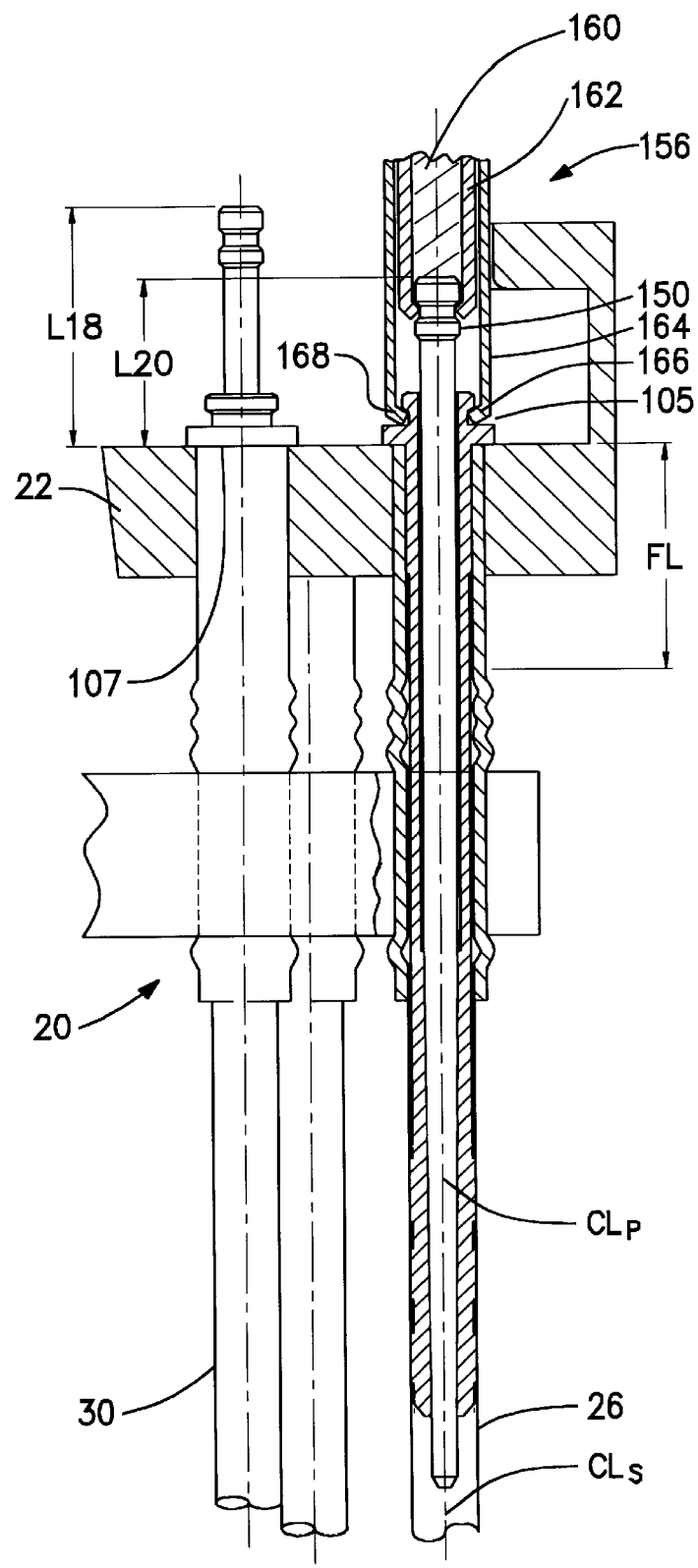
Figure 5
Figure 6

ANCHOR ASSEMBLY FOR FUEL BUNDLE

BACKGROUND

The weight of the nuclear reactor fuel bundle or assembly used in certain nuclear reactors, such as commercial light water reactors, consists primarily of an upper end fitting, the fuel rods, a lower end fitting, and the intermediate grid cages.

When handling the fuel bundle, a fixture such as a refueling mast or grapple is connected to the upper end fitting. When the fuel bundle is lifted, most of the weight of the fuel bundle is carried by the fuel rod guide tubes that are connected to the upper end fitting and which descend through the intermediate grid cages. Consequently, the structural integrity of the guide tubes must be intact in order to safely move the fuel bundle.

In some cases, the structural integrity of the guide tubes is not intact, or the guide tube may at least be of questionable structural integrity. Guide tubes have experienced problems with the formation of defects that may be caused by, for example, stress corrosion cracking that may be induced by the service environment within a nuclear reactor or spent fuel pool. If such cracks or other flaws are present or suspected to be present in the guide tubes, the structural integrity of the guide tube must be improved in order to render the fuel bundle safe for handling.

FIG. 1 depicts apparatus that has been used in attempts to repair the structural integrity of a guide tube (2) shown attached to a portion of a fuel bundle (3). The apparatus includes a sleeve (4) and a threaded rod (6). The sleeve includes a clamping portion (8), a threaded portion (10), and a flared surface (12). The threaded rod has a flared surface (14) and a threaded portion (16) that screws into the threaded portion (10) of the sleeve.

By turning the bolt head (18) in the appropriate direction, the threaded rod is moved axially relative to the sleeve so as to pull the rod's flared surface (14) into the flared surface (12) on the sleeve. Further turning of the bolt head will cause the clamping portion (8) to expand from a relaxed position and into load bearing contact with the inside surface of the guide tube. The sleeve can have one or more stress relief slots (not shown), extending over its longitudinal length to facilitate the expansion of the sleeve. A separate locking means (not shown) is used to prevent the pin from rotating and thus maintain the pin the in sleeve.

Given the need for both safety and speed when moving nuclear reactor fuel bundles, it desirable to have an improved means for assuring the structural integrity of a guide tube.

SUMMARY

The anchor assembly apparatus of the present invention is used to improve the structural integrity of a guide tube and comprises an elongated sleeve that can be installed into the guide tube through a receiving end at the upper end fitting and an elongated pin. The elongated pin is inserted into the sleeve at the upper end fitting, causing a portion of the sleeve to radially expand into and contact an inside surface of the guide tube, thus imparting a radial force into the guide tube. The expansion is such that the radial forces developed between the sleeve, pin, and guide tube, lock the sleeve and pin into place in the guide tubes. With these members thus installed, the sleeve can carry the loads that would otherwise be carried by the guide tube, or portions of the tube that contain a structural flaw.

The sleeve has a proximate end, and a distal end that is adapted for insertion into the guide tube. The pin has a near end, as well as a far end adapted for insertion into the sleeve at the sleeve's proximate end. The pin includes an external surface that applies a radial force to an inner surface of the sleeve when the pin is inserted into the sleeve. The force is sufficient to cause a locking surface on the sleeve to expand radially outwards. Thus, when the sleeve is installed into the guide tube, and the pin is installed into the sleeve, the locking surface bears against the guide tube to retain the sleeve in the guide tube, and the external surface bears against the inner surface to retain the pin in the sleeve.

According to another aspect of the invention, the proximate surface has a load bearing surface adapted to engage a portion of the fuel bundle in a load bearing relationship.

According to another aspect of the invention, at least part of the internal surface is tapered, and at least part of the external surface is tapered complementary to the internal surface.

According to another aspect of the invention, the internal surface has a taper ratio of about 0.125 inches for every 12 inches.

According to another aspect of the invention, the internal surface extends from at least about the distal end towards the proximate end.

According to another aspect of the invention, the sleeve has at least one stress relief slot extending from at least about the distal end towards the proximate end.

According to another aspect of the invention, the locking surface comprises one or more rings.

According to another aspect of the invention, apparatus is provided for improving the structural integrity of a guide tube in a nuclear fuel bundle wherein, the guide tube has a structural flaw positioned at a flaw distance from a guide tube receiving end. The apparatus includes an elongated sleeve with a proximate end, a distal end adapted for insertion into the guide tube receiving end, and a locking surface. The locking surface is positioned from the proximate end a grip length that is longer than the flaw distance. The apparatus also includes an elongated pin having a near end, and a far end adapted for insertion into the sleeve at said proximate end. The elongated pin has an external surface that applies a radial force to an inner surface of the elongated sleeve when the elongated pin is installed in the elongated sleeve, and the radial force is sufficient to cause the locking surface to expand radially outward. Consequently, when the elongated sleeve is installed in the guide tube, and the elongated pin is installed in the sleeve, the locking surface bears against the guide tube to retain the elongated sleeve in the guide tube, and the flaw is positioned between the proximate end and the locking surface.

According to another aspect of the invention, the proximate end is adapted to engage a portion of the fuel bundle in a load bearing relationship.

According to another aspect of the invention, the internal surface and the external surface are self-locking.

According to another aspect of the invention, in a nuclear fuel bundle having one or more guide tubes, wherein the guide tubes function as load carrying members when the fuel bundle is moved, a method is provided for improving the structural integrity of a guide tube. A sleeve is provided having a load surface adjacent a proximate end and a locking surface adjacent a distal end. The distal end of the sleeve is inserted into a receiving end of the guide tube, and the sleeve is moved into the guide tube until the load surface engages a portion of the fuel bundle, and the locking surface is moved until the locking surface engages the guide tube in a load bearing relationship.

According to another aspect of the invention, a pin is inserted into the sleeve through the sleeve's proximate end, until an external surface on the pin contacts an internal surface on the sleeve adjacent the locking surface, and a force is applied to the pin to move the pin a further distance into the sleeve to cause the locking surface to radially expand into the guide tube.

According to another aspect of the invention, the location of a flaw in a guide tube is determined, and a sleeve is provided wherein the flaw will be positioned between the load surface and the locking surface when the sleeve inserted into the guide tube.

According to another aspect of the invention, the force applied to the pin is measured.

According to another aspect of the invention, the force applied to the pin is compared with a predetermined acceptable force range.

According to another aspect of the invention, the further distance that the pin moves is measured.

According to another aspect of the invention, the further distance that the pin moves is compared with a predetermined acceptable length.

BRIEF DESCRIPTION OF THE DRAWINGS

FIG. 5 is a front elevation view of an elongated pin;

FIG. 6 is a front elevation view of a fuel bundle, in partial cross section, showing an installation procedure for an elongated sleeve and a pin.

DETAILED DESCRIPTION

Figure 1:
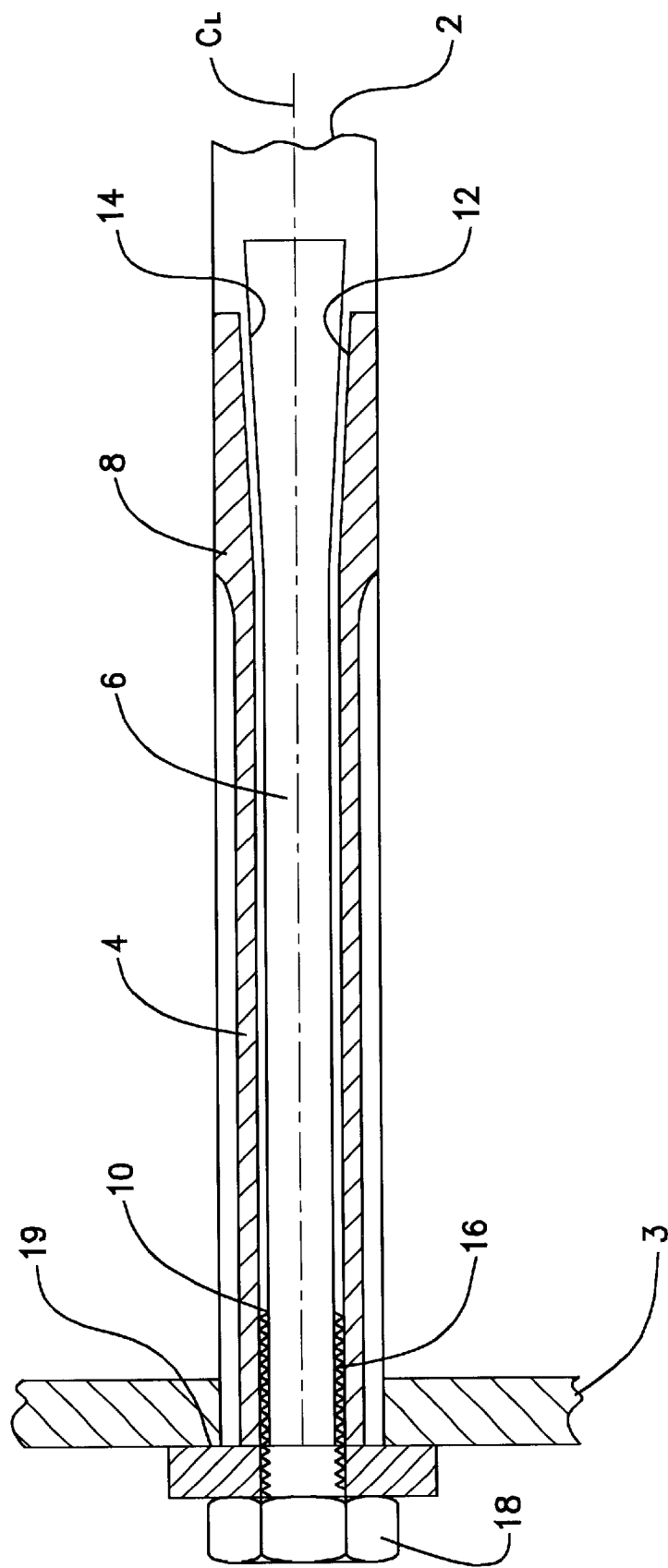
FIG. 1 is a front elevation view of a prior art device, shown installed in a guide tube and in partial cross section.
Figure 2:
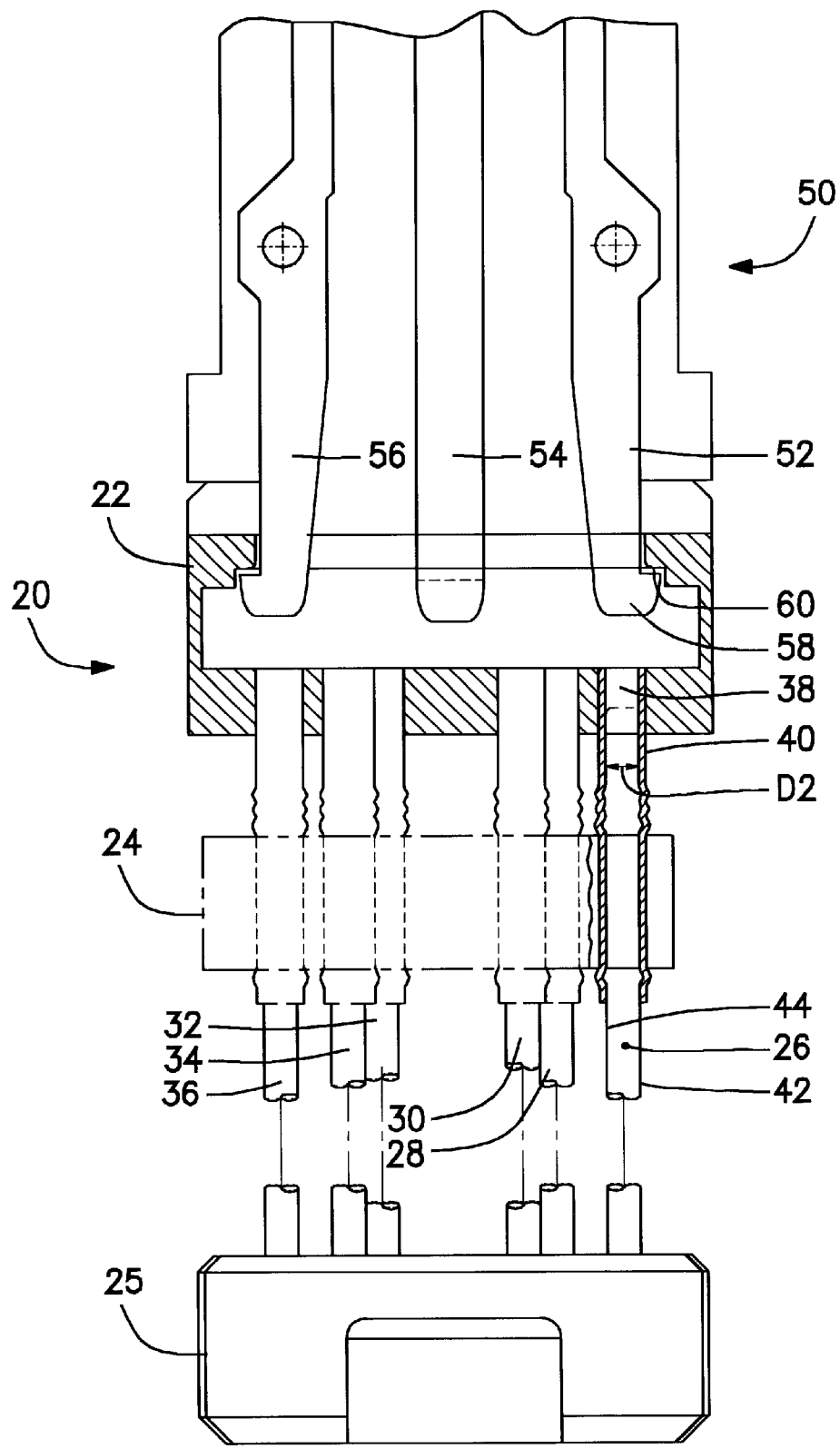
FIG. 2 is a front elevation view of a lifting fixture and fuel bundle shown in partial cross section.

FIG. 2 shows a portion of a fuel bundle (20) upon which apparatus having features found on the present invention may be used. The configuration (e.g., geometry, weight, material properties, location of flaws) of the fuel bundle may vary from one application to the next. Consequently, the skilled artisan will further recognize that the configuration of the apparatus described herein may vary to accommodate different fuel bundle configurations.

The fuel bundle includes an upper end fitting (22), an intermediate grid cage (24), and a lower end fitting (25). A plurality of fuel rod guide tubes (26), (28), (30), (32), (34) and (36) extend from upper end fitting (22) through the intermediate grid cage (24).

Guide tube (26), which is representative of the other guide tubes, has a receiving end (38) connected to upper end fitting (22). The guide tube comprises an outer portion (40) that can be made from, for example, stainless steel, and a thimble tube or inner portion (42) that can be made from, for example, a zirconium alloy. The guide tube has an inside surface (44) with an inner guide tube diameter (D2).

Portions of a lifting fixture (50) are shown in engagement with the upper end fitting (22). The fixture comprises a plurality of lifting arms (52), (54) and (56) that descend into the upper end fitting. As shown with respect to lifting arm (52), the arms include a tab (58) that extends outward from the arm to engage a ledge (60) on the upper end fitting. With the fixture thus installed, the fixture can be used to raise and maneuver the fuel bundle. When the fuel bundle is raised, the weight of the upper end fitting (20) is carried by the fixture (50), but most of the weight of the fuel bundle, found in the fuel rods (not shown), intermediate grid cage (24), and lower end fitting (25) must be carried by the guide tubes (26), (28), (30), (32), (34) and (36).

Figure 3:
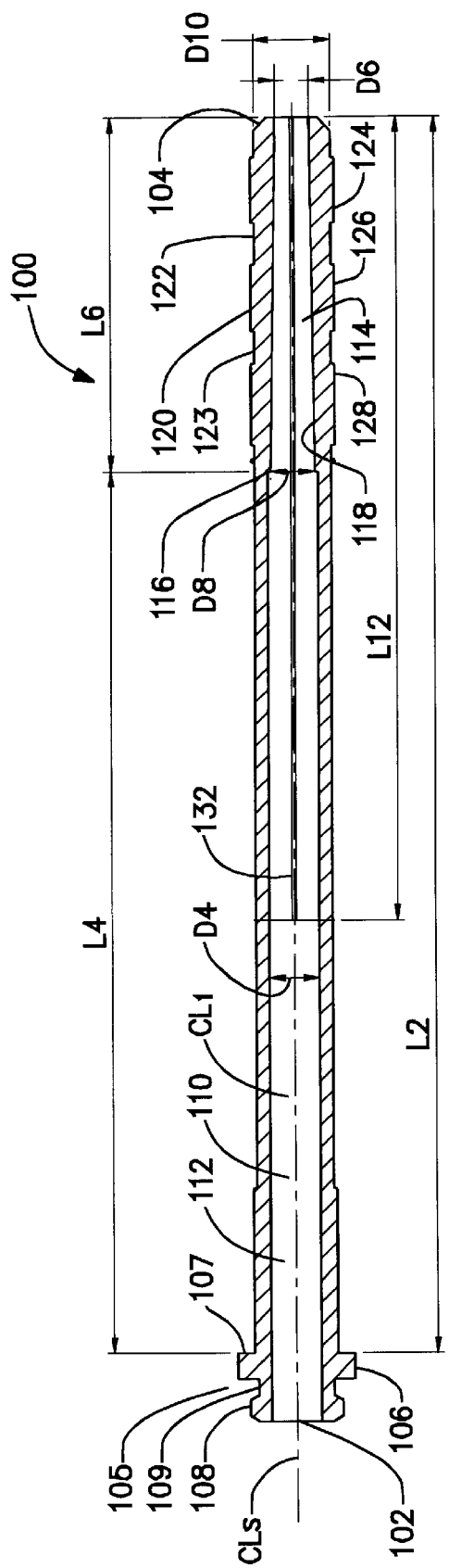
FIG. 3 is a front elevation view, shown in cross section, of an elongated sleeve.

FIG. 3 shows an elongated sleeve (100) having features found on the present invention. The sleeve is cylindrical with respect to centerline (CLs), and is preferably constructed from a material such as stainless steel, ASME SA-479, Type 410, Condition 1, with an $R_c$ of approximately 20. Fabrication techniques are those known to a skilled artisan. The sleeve (100) includes a proximate end (102) and a distal end (104), the distal end being adapted for insertion into receiving end (38) of a guide tube.

Sleeve fixture attachment (105) includes a flange (106) with a load surface (107) adapted to rest against upper end fitting (22), adjacent receiving end (38), in a load bearing relationship when the sleeve (100) is installed into a guide tube. The sleeve fixture attachment also includes a collar member (108) and a slot (109). The sleeve length (L2) extends from the load surface (107) to the distal end (104).

Inner passage (110) extends from the proximate end (102) to the distal end (104). The inner passage has a first portion (112) and a second portion (114). The first portion has a substantially uniform diameter (D4) beginning at the proximate end (102) and extending a reach length (L4) to a wide end (116) of second portion (114). The reach length (L4) is long enough to place the second portion (114) further from the upper end fitting (22) than any flaws that may be found in the guide tube.

The second portion has a grip length (L6), a distal end diameter (D6) and a wide end diameter (D8). Diameter (D8) can be the same as diameter (D4) and is larger than diameter (D6). Thus, the second portion (114) has a tapered inner surface (118). The diameters (D6) and (D8) are selected to provide self-locking capability when the pin and sleeve are in a fully installed condition in a guide tube. The term self-locking as used herein refers to a condition in which the forces developed between the pin and sleeve are sufficient to retain the pin in the sleeve, without the need of additional locking means. Self-locking may be achieved with a variety of taper ratios, but the taper ratio will preferably be about 0.10 to 0.15 inches per 10 to 13 inches, and most preferably be about 0.125 inches per 12 inches. Thus, in the most preferable case, when moving from the wide end (116) to the proximate end (104), the radius of the diameter of the second portion (114) decreases about 0.125 inches for every 12 inches traveled.

External gripping or locking surface (120) extends from the distal end (104) to the wide end (116), and has a diameter (D10). The diameter is selected to be slightly smaller than diameter (D2) of the guide tube to permit installation of the sleeve into the guide tube at receiving end (38).

Figure 4:
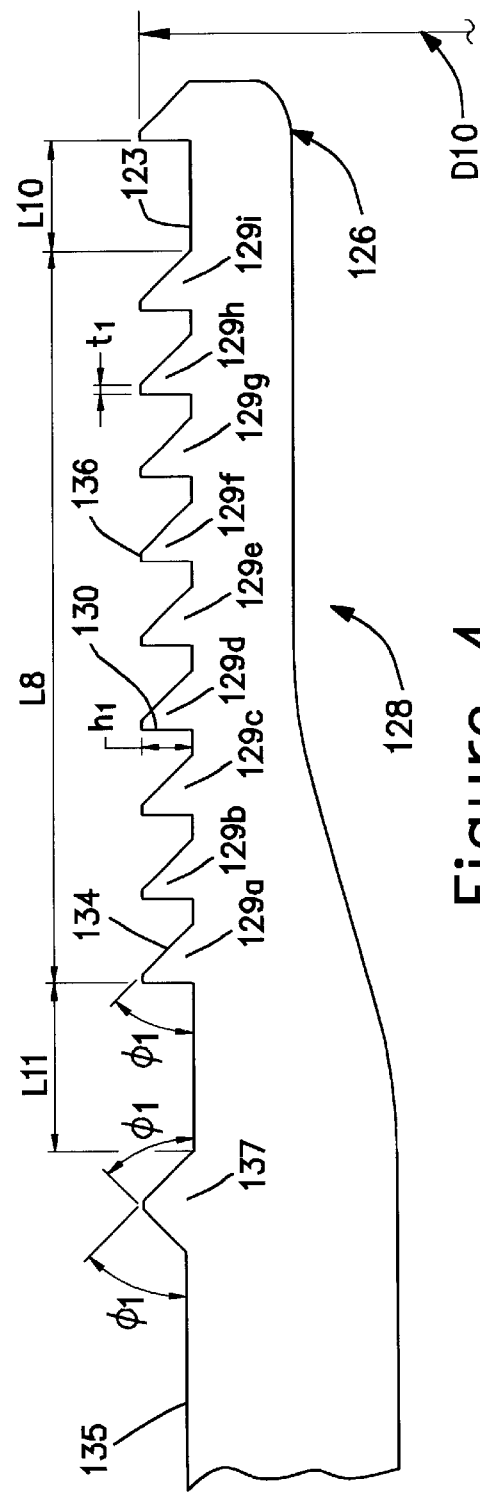
FIG. 4 is a front elevation view showing a cross section view of portions of a locking surface.

The locking surface (120) has three buttresses (124), (126) and (128). Each buttress has a buttress length (L8), and they are separated from each other by relief portions (122) and (123) which have a relief length (L10). In the embodiment shown, (L8) can be about 0.44 inches and (L10) can be about 0.25 inches. Each buttress can be machined or otherwise prepared, using methods known to a skilled artisan, to provide a surface for gripping the inside surface (44) of the guide tubes. For example, as shown with respect to buttress (128) in FIG. 4, the buttresses include a series of rings (129a), (129b), (129c), (129d), (129e), (129f), (129g), (129h) and (129i). The ring's cross sections have a back surface (130) with a ring height (h1), a forward sloped surface (134) at an angle of $\emptyset_1$ with respect to sleeve cylindrical outer surface (135), and a top surface (136) with length (t1). In the embodiment shown, (h1) can measure about 0.031 inches, $\emptyset_1$ can measure about 45°, and ($t_1$) can measure about 0.005 inches. In addition to the buttresses (124), (126), and (128), the locking surface (120) can include an additional ring (137). Ring (137) is located a distance (L11) from ring (129a), and (L11) can measure about 0.09 inches. In order to facilitate the radial expansion of the locking member (120), stress relief slot (132) extends from the distal end (104) of the elongated sleeve (100) towards the sleeve's proximate end (102) for a slot length (L12). Preferably, four such slots are evenly spaced around the circumference of the elongated sleeve (100).

FIG. 5 shows an elongated pin (140) having a near end (142) and a far end (144), the far end being adapted for insertion into the sleeve's proximate end. The pin is preferably machined from a material such as stainless steel, ASME SA-479, Type 410, Condition 1, with an $R_c$ of about 20. Fabrication techniques are those known to a skilled artisan. The pin has an overall pin length (L13) that can be selected to be at least as long as the sleeve length (L2). The pin includes a uniform portion (146) with a length (L14) and a tapered portion (148) with a length (L16). The length (L16) can be selected to be at least as long as length (L6) on the elongated sleeve (100).

The uniform portion has a constant diameter (D12) that is selected to be slightly less than the diameter (D4) of the first portion (112) of inner passage (110) of elongated sleeve (100) so that the pin can be moved to a fully installed position in the sleeve. The tapered portion has a diameter (D14) that decreases when moving in the direction from the uniform portion (146) to the far end (144) to provide an external surface (148) that is tapered. The taper ratio is selected to be complementary to or match that of the tapered inner surface (118) on the elongated sleeve (100). The near end (142) of the pin includes a pin fixture attachment (150), with a head (151), a slot (152), and a knob (154).

Having described the construction of apparatus embodying features found on the invention, the use of such apparatus will now be explained.

The configuration of a fuel bundle can be determined by referring to engineering drawings, specifications, and if necessary direct measurement. Flaws in the guide tubes may be identified and located by visual inspection and nondestructive testing methods known to those skilled in the art.

In the fuel bundle (20) shown in FIG. 6 the inner diameter (D2) of the guide tubes can be 0.505 inches, and the weight of the fuel bundle can be expected to be about 1300 pounds. A crack or other flaw (not shown) can be positioned in guide tubes (26) and (30) a flaw length (FL) of about 2 inches from the upper end fitting (22).

An elongated sleeve (100) is fabricated with a reach length (L4) of about 5.5 inches so as to position the locking surface (120) below the defect when the sleeve (100) is installed into the guide tube, thus placing the defect between the locking surface and the upper end fitting. The locking surface diameter (D10) is selected to be 0.500 inches so that the sleeve can be inserted into the guide tube with a slight amount of clearance. The grip length can be selected to be about 2.25 inches, and diameter (D6) is selected to be about 0.214 inches. Four stress relief slots (132) are saw cut into the sleeve, evenly spaced circumferentially on the sleeve at 90° from each other, with a length (L12) of about 4.5 inches.

An elongated pin (140) is fabricated with an overall length (L13) of about 8.9 inches, a tapered portion length (L16) of about 4.12 inches, and a uniform portion length (L14) of about 4.75 inches. The diameter (D12) of the uniform portion is about 0.300 inches so as to fit within the first portion (112) of the sleeve with a slight amount of clearance. The diameter (D14) of the tapered portion (148) is about 0.214 inches at the far end (144).

The pin is installed into the sleeve through the sleeve's proximate end. A tool (156) can be used to install the pin. The tool includes a hydraulic powered ram (160) and grappling fixtures (162) and (164) which are adapted for attachment to the pin attachment (150) and sleeve attachment (105), respectively.

The tool can be used to place a pin into a sleeve in a preinstalled condition resulting in an anchor assembly can be transported as a unit. The tool is also used to place the anchor assembly into fully installed position in a fuel bundle (20). During the preinstallation procedure, the grappling fixture (164) holds the sleeve (100) stationary with tabs (166) and (168) inserted into slot (152), while the ram (160) applies force to the pin (140). The hydraulic ram forces the pin far enough into the sleeve to cause the pin's outer surface (148) to bear against the sleeves inner surface (118) and cause a slight radial expansion of the locking surface (120). The expansion is sufficient to develop a resilient locking force between these two surfaces to lock the pin into the sleeve under anticipated handling and transport conditions, but is not so great as to prevent the sleeve from being inserted into a guide tube.

After preinstallation, the anchor assembly comprised of the sleeve and pin are inserted into the guide tube in need of structural improvement. As shown with respect to guide tube (30), the sleeve is inserted through the guide tube's receiving end (38) until the load surface (107) contacts the upper end fitting (22). In this partially installed position, the head (151) of the pin is at a partially installed distance (L18) from the upper end fitting.

As shown with respect to guide tube (26), the hydraulic ram (160) and grappling fixtures (162) and (164) are used to further move the pin into the sleeve, until these items are in a fully installed condition, wherein the head (151) is positioned a fully installed distance (L20) from the upper end fitting. As the ram applies force to the pin, the pin's tapered external surface (148) moves relative to the sleeve's tapered internal surface (118). This relative movement causes the tapered surface on the pin to impart a force into the tapered surface on the sleeve. Part of this force is radial, such that it causes the sleeve's locking surface (120) to radially expand into the guide tubes. During the expansion process, stresses in the sleeve are reduced by the stress relief slots. During this portion of the installation procedure, both the travel distance of the pin and the force applied to the pin are monitored using means known to skilled artisans to ensure that they remain within the limits of a predetermined acceptable force range and a predetermined acceptable length. These predetermined limits can be derived through calculations and or tests applicable to a given configuration of a fuel bundle. These predetermined limits are sufficient to cause the locking surface to expand out far enough to engage the guide tube in a gripping load bearing relationship and may be recorded and stored as a permanent record of acceptance. The load and displacement can be about 215 to 235 pounds, and about 0.20 to 0.25 inches respectively. With these loads and displacements, the anchor assembly and guide tube can support weight loads of up to about 1000 pounds.

With the pin fully installed into the sleeve, the forces developed between the pin and sleeve occur between the pin's external surface (148) and the sleeve's internal surface (118). The near end of the pin does not carry any substantially loads. The frictional forces developed between the pin and sleeve are sufficient to lock these items in place so that no additional or alternative locking means are required. Moreover, the forces developed between the locking surface (120) and inside surface (48) are sufficient to provide a griping load bearing relationship that locks the sleeve into place inside the guide tube so that the sleeve will not move in the direction of centerline ($CL_s$) under predetermined weight loads. When the fuel bundle is lifted, the weight of the fuel bundle that would ordinarily be carried by the guide tube is carried by the sleeve. The bearing weight is transferred into the sleeve's locking surface (120) via the gripping load bearing relationship developed between the guide tube inner surface (44) and the sleeve's locking surface (120). The weight load transferred into the sleeve is carried by the load surface (107) resting against the fuel bundle. Since the flaw is positioned between these two load points, the weakened portion of the guide tube is isolated from its usual load carrying function, which is now performed by the sleeve.

To remove the pin and sleeve from a guide tube, fingers (170) and (172) are inserted into slot (152), and tabs (166) and (168) are inserted into slot (109). The tool applies a retraction force to the pin head (151) via fingers (170) and (172), while tabs (166) and (168) hold the sleeve in place. The pin is thus extracted while the sleeve is held stationary, and after the pin is extracted the locking surface (120) returns to an unstressed condition wherein it does not grip the inside surface (48) of a guide tube. The sleeve is then removed from the guide tube.

Although the invention has been described in detail, with respect to apparatus and method embodying aspects of the invention, it is to be understood that the description is intended by way of illustration and example only, and is not to be taken by way of limitation. Accordingly, the spirit and scope of the invention are to be limited only by the terms at the appended claims.

What is claimed:

1. Anchor assembly apparatus for improving the structural integrity of a guide tube in a nuclear fuel bundle, comprising:
    a. a sleeve having a proximate end, and a distal end adapted for insertion into a receiving end guide tube;
    b. a pin having a near end, and a far end adapted for insertion into said sleeve at said proximate end; and
    c. said pin having an external surface adapted to apply a radial force to an inner surface of said sleeve when said pin is inserted into said sleeve, the force being sufficient to cause a locking surface on said sleeve to expand radially outward;
    whereby, when said sleeve is installed into the guide tube, and said pin is installed into said sleeve, said locking surface bears against the guide tube to retain said sleeve in the guide tube, and said external surface bears against said inner surface to retain said pin in said sleeve.

2. Apparatus as claimed in claim 1, wherein said proximate end has a load surface adapted to engage a portion of the fuel bundle in a load bearing relationship.

3. Apparatus as claimed in claim 2, wherein:
    a. at least part of said internal surface is tapered; and
    b. at least part of said external surface is tapered complementary to said internal surface.

4. Apparatus as claimed in claim 3, wherein said internal surface has a taper ratio of about 0.125 inches for about every 12 inches.

5. Apparatus as claimed in claim 3, wherein said internal surface extends from at least about said distal end towards said proximate end.

6. Apparatus as claimed in claim 5, wherein said sleeve has at least one stress relief slot extending from at least about said distal end towards said proximate end.

7. Apparatus as claimed in claim 6, wherein said locking surface comprises at least one ring.

8. Apparatus as claimed in claim 7 wherein a flaw is positioned a flaw distance from the receiving end, and said locking surface is positioned from said proximate end a reach length that is greater than the flaw distance.

9. Apparatus for improving the structural integrity of a guide tube in a nuclear fuel bundle, the guide tube having a structural flaw therein found at a flaw distance from a guide tube receiving end, comprising;
    a. an elongated sleeve having a proximate end, a distal end adapted for insertion into the guide tube receiving end, and a locking surface, said locking surface positioned from said proximate end a grip length that is longer than the flaw distance;
    b. an elongated pin having a near end, an a far end adapted for insertion into said sleeve at said proximate end;
    c. said elongated pin having an external surface adapted to apply a radial force to an inner surface of said elongated sleeve when said elongated pin is installed in said elongated sleeve, the radial force being sufficient to cause said locking surface to expand radially outward;
    whereby, when said elongated sleeve is installed in the guide tube, and said elongated pin is installed in said elongated sleeve, said locking surface bears against the guide tube to retain said elongated sleeve in the guide tube, and the flaw is positioned between said proximate end and said locking surface.

10. Apparatus as claimed in claim 9, wherein said proximate end is adapted to engage a portion of the fuel bundle in a load bearing relationship.

11. Apparatus as claimed in claim 10, wherein said elongated sleeve includes at least one stress relief slot extending from at least about said distal end towards said proximate end.

12. Apparatus as claimed in claim 11, wherein said locking surface comprises a plurality of rings.

13. Apparatus as claimed in claim 12, wherein;
    a. at least part of said internal surface is tapered; and
    b. at least part of said external surface is tapered complementary to said internal surface.

14. Apparatus as claimed in claim 13, wherein said internal surface and said external surface are self-locking.

15. Apparatus as claimed in claim 13, wherein said internal surface extends from at least about said distal end towards said proximate end.

16. In a nuclear fuel bundle having one or more guide tubes, wherein the guide tubes function as load carrying members when the fuel bundle is moved, a method for improving the structural integrity of a guide tube comprising the steps of:

a. providing a sleeve having a load surface adjacent a proximate end, and a locking surface adjacent a distal end;

b. inserting the distal end of the sleeve into a receiving end of the guide tube, and moving the sleeve into the guide tube until the load surface engages a portion of the fuel bundle; and c. moving the locking surface until the locking surface engages the guide tube in a load bearing relationship.

17. The method of claim 16, comprising the steps of inserting a pin into the sleeve through the sleeve's proximate end, until an external surface on the pin contacts an internal surface on the sleeve adjacent the locking surface, and applying a force to the pin to move the pin a travel distance into the sleeve to cause the locking surface to radially expand into the guide tube.

18. The method of claim 17, comprising the steps of:

a. determining the location of a flaw in a guide tube;

b. providing a sleeve wherein the flaw will be positioned between the load surface and the locking surface when the sleeve inserted into the guide tube.

19. The method of claim 17, comprising the step of measuring the force applied to the pin.

20. The method of claim 19, comprising the step of comparing the force applied to the pin with a predetermined acceptable force range.

21. The method of claim 17, comprising the step of measuring the travel distance that the pin moves.

22. The method of claim 21, comprising the step of comparing the travel distance that the pin moves with predetermined acceptable length.

* * * * *